(12) United States Patent
Bain

(10) Patent No.: US 7,764,710 B1
(45) Date of Patent: Jul. 27, 2010

(54) METHOD AND APPARATUS FOR PROCESSING COMMUNICATION PROTOCOL FRAME INPUT

(75) Inventor: Peter Bain, Ottawa (CA)

(73) Assignee: Altera Corporation, San Jose, CA (US)

( * ) Notice: Subject to any disclaimer, the term of this patent is extended or adjusted under 35 U.S.C. 154(b) by 1024 days.

(21) Appl. No.: 11/411,325

(22) Filed: Apr. 25, 2006

(51) Int. Cl.
*H04J 3/00* (2006.01)

(52) U.S. Cl. ............... 370/476; 370/514; 370/383; 370/395.71; 370/429; 711/113; 711/144; 711/145; 710/310; 710/74; 710/57

(58) Field of Classification Search ............... 370/469, 370/394; 708/209
See application file for complete search history.

(56) References Cited

U.S. PATENT DOCUMENTS

| | | | | |
|---|---|---|---|---|
| 4,831,571 A | * | 5/1989 | Tokumaru | 708/209 |
| 5,289,397 A | * | 2/1994 | Clark et al. | 708/491 |
| 6,314,100 B1 | * | 11/2001 | Roach et al. | 370/394 |
| 6,427,179 B1 | * | 7/2002 | Amrany et al. | 710/64 |
| 7,308,000 B2 | * | 12/2007 | Masputra et al. | 370/469 |
| 2004/0073714 A1 | * | 4/2004 | McClary et al. | 709/250 |
| 2005/0105556 A1 | * | 5/2005 | Joung et al. | 370/469 |

* cited by examiner

*Primary Examiner*—Hong Cho
*Assistant Examiner*—Yosief Berhane
(74) *Attorney, Agent, or Firm*—Martine Penilla & Gencarella, LLP

(57) ABSTRACT

If an input word bit includes overhead data, the input word bit is ignored. If the input word bit includes non-overhead data and the corresponding bit position in a first buffer is empty, the non-overhead data is stored in the corresponding bit position in the first buffer, and the corresponding bit position in the first buffer is marked as full. Otherwise, the non-overhead data is stored in the corresponding bit position in a second buffer, and the corresponding bit position in the second buffer is marked as full. When all bit positions in the first buffer are marked as full, the data is shifted out of the first buffer, rotated to be in data arrival sequence, and made available for further processing. Then, the data in the second buffer is transferred to the first buffer, and the bit positions in second buffer are reset to be marked as empty.

20 Claims, 12 Drawing Sheets

Cycle 0:

| | | | | | | | | |
|---|---|---|---|---|---|---|---|---|
| Input Word | | | | | | | | |
| Buffer B1: Data | | | | | | | | |
| Empty/Full | E | E | E | E | E | E | E | E |
| Buffer B0: Data | | | | | | | | |
| Empty/Full | E | E | E | E | E | E | E | E |
| Output Word | | | | | | | | |

Overhead Bit Count Prior to Current Cycle: 0      Rotation Amount: 0

Rotated Output Word: | | | | | | | | |

Fig. 5A

Cycle 1:

| | | | | | | | | |
|---|---|---|---|---|---|---|---|---|
| Input Word | T | d00 | d01 | d02 | d03 | d04 | d05 | d06 |
| Buffer B1: Data | | | | | | | | |
| Empty/Full | E | E | E | E | E | E | E | E |
| Buffer B0: Data | | d00 | d01 | d02 | d03 | d04 | d05 | d06 |
| Empty/Full | E | F | F | F | F | F | F | F |
| Output Word | | | | | | | | |

Overhead Bit Count Prior to Current Cycle: 0      Rotation Amount: 0

Rotated Output Word: | | | | | | | | |

Fig. 5B

Cycle 2:

| | | | | | | | | |
|---|---|---|---|---|---|---|---|---|
| Input Word | d07 | T | d08 | d09 | d10 | d11 | d12 | d13 |
| Buffer B1: Data | | | d08 | d09 | d10 | d11 | d12 | d13 |
| Empty/Full | E | E | F | F | F | F | F | F |
| Buffer B0: Data | d07 | d00 | d01 | d02 | d03 | d04 | d05 | d06 |
| Empty/Full | F | F | F | F | F | F | F | F |
| Output Word | d07 | d00 | d01 | d02 | d03 | d04 | d05 | d06 |

Overhead Bit Count Prior to Current Cycle: 1      Rotation Amount: 1

Rotated Output Word: | d00 | d01 | d02 | d03 | d04 | d05 | d06 | d07 |

Fig. 5C

Cycle 3:

| | | | | | | | | |
|---|---|---|---|---|---|---|---|---|
| | Input Word | d14 | d15 | S | T | d16 | d17 | d18 | d19 |
| Buffer B1: | Data | | | | | d16 | d17 | d18 | d19 |
| | Empty/Full | E | E | E | E | F | F | F | F |
| Buffer B0: | Data | d14 | d15 | d08 | d09 | d10 | d11 | d12 | d13 |
| | Empty/Full | F | F | F | F | F | F | F | F |
| | Output Word | d14 | d15 | d08 | d09 | d10 | d11 | d12 | d13 |

Overhead Bit Count Prior to Current Cycle: 2
Rotation Amount: 2

| Rotated Output Word | d08 | d09 | d10 | d11 | d12 | d13 | d14 | d15 |
|---|---|---|---|---|---|---|---|---|

Fig. 5D

Cycle 4:

| | | | | | | | | |
|---|---|---|---|---|---|---|---|---|
| | Input Word | d20 | d21 | d22 | d23 | T | d24 | d25 | d26 |
| Buffer B1: | Data | | | | | | d24 | d25 | d26 |
| | Empty/Full | E | E | E | E | E | F | F | F |
| Buffer B0: | Data | d20 | d21 | d22 | d23 | d16 | d17 | d18 | d19 |
| | Empty/Full | F | F | F | F | F | F | F | F |
| | Output Word | d20 | d21 | d22 | d23 | d16 | d17 | d18 | d19 |

Overhead Bit Count Prior to Current Cycle: 4
Rotation Amount: 4

| Rotated Output Word | d16 | d17 | d18 | d19 | d20 | d21 | d22 | d23 |
|---|---|---|---|---|---|---|---|---|

Fig. 5E

Cycle 5:

| | | | | | | | | |
|---|---|---|---|---|---|---|---|---|
| | Input Word | d27 | d28 | d29 | d30 | d31 | T | d32 | d33 |
| Buffer B1: | Data | | | | | | | d32 | d33 |
| | Empty/Full | E | E | E | E | E | E | F | F |
| Buffer B0: | Data | d27 | d28 | d29 | d30 | d31 | d24 | d25 | d26 |
| | Empty/Full | F | F | F | F | F | F | F | F |
| | Output Word | d27 | d28 | d29 | d30 | d31 | d24 | d25 | d26 |

Overhead Bit Count Prior to Current Cycle: 5
Rotation Amount: 5

| Rotated Output Word | d24 | d25 | d26 | d27 | d28 | d29 | d30 | d31 |
|---|---|---|---|---|---|---|---|---|

Fig. 5F

Cycle 6:

| | Input Word | d34 | d35 | d36 | d37 | d38 | d39 | T | d40 |
|---|---|---|---|---|---|---|---|---|---|
| Buffer B1: | Data | | | | | | | | d40 |
| | Empty/Full | E | E | E | E | E | E | E | F |
| Buffer B0: | Data | d34 | d35 | d36 | d37 | d38 | d39 | d32 | d33 |
| | Empty/Full | F | F | F | F | F | F | F | F |
| | Output Word | d34 | d35 | d36 | d37 | d38 | d39 | d32 | d33 |

Overhead Bit Count Prior to Current Cycle: 6    Rotation Amount: 6

| Rotated Output Word | d32 | d33 | d34 | d35 | d36 | d37 | d38 | d39 |
|---|---|---|---|---|---|---|---|---|

Fig. 5G

Cycle 7:

| | Input Word | d41 | d42 | d43 | d44 | d45 | d46 | d47 | S |
|---|---|---|---|---|---|---|---|---|---|
| Buffer B1: | Data | | | | | | | | |
| | Empty/Full | E | E | E | E | E | E | E | E |
| Buffer B0: | Data | d41 | d42 | d43 | d44 | d45 | d46 | d47 | d40 |
| | Empty/Full | F | F | F | F | F | F | F | F |
| | Output Word | d41 | d42 | d43 | d44 | d45 | d46 | d47 | d40 |

Overhead Bit Count Prior to Current Cycle: 7    Rotation Amount: 7

| Rotated Output Word | d40 | d41 | d42 | d43 | d44 | d45 | d46 | d47 |
|---|---|---|---|---|---|---|---|---|

Fig. 5H

Cycle 8:

| | Input Word | T | d48 | d49 | d50 | d51 | d52 | d53 | d54 |
|---|---|---|---|---|---|---|---|---|---|
| Buffer B1: | Data | | | | | | | | |
| | Empty/Full | E | E | E | E | E | E | E | E |
| Buffer B0: | Data | | d48 | d49 | d50 | d51 | d52 | d53 | d54 |
| | Empty/Full | E | F | F | F | F | F | F | F |
| | Output Word | | | | | | | | |

Overhead Bit Count Prior to Current Cycle: 8    Rotation Amount: 0

| Rotated Output Word | | | | | | | | |
|---|---|---|---|---|---|---|---|---|

Fig. 5I

Cycle 9:

| | Input Word | d55 | T | d56 | d57 | d58 | d59 | d60 | d61 |
|---|---|---|---|---|---|---|---|---|---|
| Buffer B1: | Data | | | d56 | d57 | d58 | d59 | d60 | d61 |
| | Empty/Full | E | E | F | F | F | F | F | F |
| Buffer B0: | Data | d55 | d48 | d49 | d50 | d51 | d52 | d53 | d54 |
| | Empty/Full | F | F | F | F | F | F | F | F |
| | Output Word | d55 | d48 | d49 | d50 | d51 | d52 | d53 | d54 |

Overhead Bit Count Prior to Current Cycle: 9    Rotation Amount: 1

| Rotated Output Word | d48 | d49 | d50 | d51 | d52 | d53 | d54 | d55 |
|---|---|---|---|---|---|---|---|---|

Fig. 5J

Cycle 10:

| | Input Word | d62 | d63 | T | d64 | d65 | d66 | d67 | d68 |
|---|---|---|---|---|---|---|---|---|---|
| Buffer B1: | Data | | | | d64 | d65 | d66 | d67 | d68 |
| | Empty/Full | E | E | E | F | F | F | F | F |
| Buffer B0: | Data | d62 | d63 | d56 | d57 | d58 | d59 | d60 | d61 |
| | Empty/Full | F | F | F | F | F | F | F | F |
| | Output Word | d62 | d63 | d56 | d57 | d58 | d59 | d60 | d61 |

Overhead Bit Count Prior to Current Cycle: 10    Rotation Amount: 2

| Rotated Output Word | d56 | d57 | d58 | d59 | d60 | d61 | d62 | d63 |
|---|---|---|---|---|---|---|---|---|

Fig. 5K

Cycle 11:

| | Input Word | d69 | d70 | d71 | T | d72 | d73 | d74 | d75 |
|---|---|---|---|---|---|---|---|---|---|
| Buffer B1: | Data | | | | | d72 | d73 | d74 | d75 |
| | Empty/Full | E | E | E | E | F | F | F | F |
| Buffer B0: | Data | d69 | d70 | d71 | d64 | d65 | d66 | d67 | d68 |
| | Empty/Full | F | F | F | F | F | F | F | F |
| | Output Word | d69 | d70 | d71 | d64 | d65 | d66 | d67 | d68 |

Overhead Bit Count Prior to Current Cycle: 11    Rotation Amount: 3

| Rotated Output Word | d64 | d65 | d66 | d67 | d68 | d69 | d70 | d71 |
|---|---|---|---|---|---|---|---|---|

Fig. 5L

Cycle 12:

| | | | | | | | | |
|---|---|---|---|---|---|---|---|---|
| | Input Word | d76 | d77 | d78 | d79 | S | T | d80 | d81 |
| Buffer B1: | Data | | | | | | | d80 | d81 |
| | Empty/Full | E | E | E | E | E | E | F | F |
| Buffer B0: | Data | d76 | d77 | d78 | d79 | d72 | d73 | d74 | d75 |
| | Empty/Full | F | F | F | F | F | F | F | F |
| | Output Word | d76 | d77 | d78 | d79 | d72 | d73 | d74 | d75 |

Overhead Bit Count Prior to Current Cycle: 12   Rotation Amount: 4

| Rotated Output Word | d72 | d73 | d74 | d75 | d76 | d77 | d78 | d79 |
|---|---|---|---|---|---|---|---|---|

Fig. 5M

Cycle 13:

| | | | | | | | | |
|---|---|---|---|---|---|---|---|---|
| | Input Word | d82 | d83 | d84 | d85 | d86 | d87 | T | d88 |
| Buffer B1: | Data | | | | | | | | d88 |
| | Empty/Full | E | E | E | E | E | E | E | F |
| Buffer B0: | Data | d82 | d83 | d84 | d85 | d86 | d87 | d80 | d81 |
| | Empty/Full | F | F | F | F | F | F | F | F |
| | Output Word | d82 | d83 | d84 | d85 | d86 | d87 | d80 | d81 |

Overhead Bit Count Prior to Current Cycle: 14   Rotation Amount: 6

| Rotated Output Word | d80 | d81 | d82 | d83 | d84 | d85 | d86 | d87 |
|---|---|---|---|---|---|---|---|---|

Fig. 5N

Cycle 14:

| | | | | | | | | |
|---|---|---|---|---|---|---|---|---|
| | Input Word | d89 | d90 | d91 | d92 | d93 | d94 | d95 | S |
| Buffer B1: | Data | | | | | | | | |
| | Empty/Full | E | E | E | E | E | E | E | E |
| Buffer B0: | Data | d89 | d90 | d91 | d92 | d93 | d94 | d95 | d88 |
| | Empty/Full | F | F | F | F | F | F | F | F |
| | Output Word | d89 | d90 | d91 | d92 | d93 | d94 | d95 | d88 |

Overhead Bit Count Prior to Current Cycle: 15   Rotation Amount: 7

| Rotated Output Word | d88 | d89 | d90 | d91 | d92 | d93 | d94 | d95 |
|---|---|---|---|---|---|---|---|---|

Fig. 5O

Cycle 15:

| | | | | | | | | |
|---|---|---|---|---|---|---|---|---|
| Input Word | f | f | f | f | f | T | d00 | d01 |
| Buffer B1: Data | | | | | | | | |
| Empty/Full | E | E | E | E | E | E | E | E |
| Buffer B0: Data | | | | | | | d00 | d01 |
| Empty/Full | E | E | E | E | E | E | F | F |
| Output Word | | | | | | | | |

Overhead Bit Count Prior to Current Cycle: 16    Rotation Amount: 0

| Rotated Output Word | | | | | | | | |
|---|---|---|---|---|---|---|---|---|

Fig. 5P

Cycle 16:

| | | | | | | | | |
|---|---|---|---|---|---|---|---|---|
| Input Word | d02 | d03 | d04 | d05 | d06 | d07 | T | d08 |
| Buffer B1: Data | | | | | | | | d08 |
| Empty/Full | E | E | E | E | E | E | E | F |
| Buffer B0: Data | d02 | d03 | d04 | d05 | d06 | d07 | d00 | d01 |
| Empty/Full | F | F | F | F | F | F | F | F |
| Output Word | d02 | d03 | d04 | d05 | d06 | d07 | d00 | d01 |

Overhead Bit Count Prior to Current Cycle: 22    Rotation Amount: 6

| Rotated Output Word | d00 | d01 | d02 | d03 | d04 | d05 | d06 | d07 |
|---|---|---|---|---|---|---|---|---|

Fig. 5Q

Cycle 17:

| | | | | | | | | |
|---|---|---|---|---|---|---|---|---|
| Input Word | d09 | d10 | d11 | d12 | d13 | d14 | d15 | S |
| Buffer B1: Data | | | | | | | | |
| Empty/Full | E | E | E | E | E | E | E | E |
| Buffer B0: Data | d09 | d10 | d11 | d12 | d13 | d14 | d15 | d08 |
| Empty/Full | F | F | F | F | F | F | F | F |
| Output Word | d09 | d10 | d11 | d12 | d13 | d14 | d15 | d08 |

Overhead Bit Count Prior to Current Cycle: 23    Rotation Amount: 7

| Rotated Output Word | d08 | d09 | d10 | d11 | d12 | d13 | d14 | d15 |
|---|---|---|---|---|---|---|---|---|

Fig. 5R

Cycle 18:

| Input Word | T | d16 | d17 | d18 | d19 | d20 | d21 | d22 |
|---|---|---|---|---|---|---|---|---|
| Buffer B1: Data | | | | | | | | |
| Empty/Full | E | E | E | E | E | E | E | E |
| Buffer B0: Data | | d16 | d17 | d18 | d19 | d20 | d21 | d22 |
| Empty/Full | E | F | F | F | F | F | F | F |
| Output Word | | | | | | | | |

Overhead Bit Count Prior to Current Cycle: 24
Rotation Amount: 0

| Rotated Output Word | | | | | | | | |
|---|---|---|---|---|---|---|---|---|

Fig. 5S

Cycle 19:

| Input Word | d23 | T | d24 | d25 | d26 | d27 | d28 | d29 |
|---|---|---|---|---|---|---|---|---|
| Buffer B1: Data | | | d24 | d25 | d26 | d27 | d28 | d29 |
| Empty/Full | E | E | F | F | F | F | F | F |
| Buffer B0: Data | d23 | d16 | d17 | d18 | d19 | d20 | d21 | d22 |
| Empty/Full | F | F | F | F | F | F | F | F |
| Output Word | d23 | d16 | d17 | d18 | d19 | d20 | d21 | d22 |

Overhead Bit Count Prior to Current Cycle: 25
Rotation Amount: 1

| Rotated Output Word | d16 | d17 | d18 | d19 | d20 | d21 | d22 | d23 |
|---|---|---|---|---|---|---|---|---|

Fig. 5T

Cycle 20:

| Input Word | d30 | d31 | T | d32 | d33 | d34 | d35 | d36 |
|---|---|---|---|---|---|---|---|---|
| Buffer B1: Data | | | | d32 | d33 | d34 | d35 | d36 |
| Empty/Full | E | E | E | F | F | F | F | F |
| Buffer B0: Data | d30 | d31 | d24 | d25 | d26 | d27 | d28 | d29 |
| Empty/Full | F | F | F | F | F | F | F | F |
| Output Word | d30 | d31 | d24 | d25 | d26 | d27 | d28 | d29 |

Overhead Bit Count Prior to Current Cycle: 26
Rotation Amount: 2

| Rotated Output Word | d24 | d25 | d26 | d27 | d28 | d29 | d30 | d31 |
|---|---|---|---|---|---|---|---|---|

Fig. 5U

Cycle 21:

| | Input Word | d37 | d38 | d39 | T | d40 | d41 | d42 | d43 |
|---|---|---|---|---|---|---|---|---|---|
| Buffer B1: | Data | | | | | d40 | d41 | d42 | d43 |
| | Empty/Full | E | E | E | E | F | F | F | F |
| Buffer B0: | Data | d37 | d38 | d39 | d32 | d33 | d34 | d35 | d36 |
| | Empty/Full | F | F | F | F | F | F | F | F |
| | Output Word | d37 | d38 | d39 | d32 | d33 | d34 | d35 | d36 |

Overhead Bit Count Prior to Current Cycle: 27    Rotation Amount: 3

| Rotated Output Word | d32 | d33 | d34 | d35 | d36 | d37 | d38 | d39 |
|---|---|---|---|---|---|---|---|---|

Fig. 5V

METHOD AND APPARATUS FOR PROCESSING COMMUNICATION PROTOCOL FRAME INPUT

BACKGROUND

Today's electronic devices may communicate with each other using commonly understood communication protocols. These communication protocols can implement communication protocol frame structures that include a combination of data bits and overhead bits. For example, in one type of frame structure, fixed-size blocks of data bits can be separated by variable-size blocks of overhead bits. The overhead bits are included in the frame structure to enable implementation of communication control functions. Before the data bits in the frame structure can be utilized by a receiving device, the overhead bits need to be removed from their interspersed positions within the data bits. Thus, the receiving device is tasked with extracting the overhead bits from a data stream defined in accordance with the frame structure. The receiving device is also tasked with shifting the data bits together to fill empty bit positions that had been occupied by the extracted overhead bits. Upon completion of these tasks, the resulting contiguous data is suitable for further processing by the receiving device.

Conventionally, extraction of the overhead bits from the data stream and shifting of the data bits together is accomplished using a barrel shifter and shift register. The barrel shifter functions to realign the data bits such that the overhead bits are squeezed out of the data stream. The realigned data is then appended to the end of the shift register. When a number of data bits corresponding to an output word size are present in the shift register, the number of data bits are shifted out of the shift register.

Those skilled in the art should appreciate that barrel shifters are large and complex because each input bit needs to be capable of going to each output bit. For example, a 32-bit barrel shifter would require 32, 32-to-1 multiplexers. Also, when applied to extract data from a frame structure having fixed-size blocks of data bits separated by variable-size blocks of overhead bits, the complexity and size of the barrel shifter logic and the shifter register control logic is further increased to account for the variability in the size of the blocks of overhead bits and the corresponding variability in the amount of data bit shifting required. Thus, when implemented in a programmable logic device (PLD), the barrel shifter and shift register control logic consumes a large number of logic elements. Also, the complex logic required for the barrel shifter and shift register control logic can introduce a four stage latency, or more, in shifting the received data out for further processing by the receiving device. Thus, use of the barrel shifter and shift register for extracting control bits from a data stream can slow down the rate of communication. Additionally, routing of the data between the barrel shifter and the shift register can become quite difficult, particularly when implemented in a PLD.

In view of the foregoing, a more efficient solution is needed for removing overhead bits and recovering data bits from a received communication protocol frame data stream.

SUMMARY

In one embodiment, a method is disclosed for processing communication protocol frame input. The communication protocol frame input is received for processing in the form of input words, wherein each input word includes a fixed number of bit positions that can each include either overhead data or non-overhead data. The method includes an operation for identifying whether a bit position in a received input word includes non-overhead data. The method includes checking an empty/full status of a data bit position in a first buffer that corresponds to the bit position in the received input word. If the corresponding data bit position in the first buffer is empty, the non-overhead data identified in the input word is stored in the corresponding data bit position in the first buffer, and the corresponding data bit position in the first buffer is indicated as being full. Otherwise, if the corresponding data bit position in the first buffer is full, the non-overhead data identified in the input word is stored in the corresponding data bit position in a second buffer, and the corresponding data bit position in the second buffer is indicated as being full. The method includes processing each bit position in the received input word in the manner indicated above with respect to identifying whether the bit position includes non-overhead data and storing the non-overhead data in either the first or second buffer, as appropriate. The method further includes an operation for shifting data out of the first buffer when each data bit position in the first buffer is indicated as being full. Also, when data is shifted out of the first buffer, the method includes an operation for transferring data from the second buffer to the first buffer.

In another embodiment, an apparatus for processing communication protocol frame input is disclosed. The apparatus includes a first buffer and a second buffer. Each of the first and second buffers includes a respective data bit position corresponding to each bit position in an input word. The apparatus also includes input processing logic defined to identify non-overhead data in each bit position in the input word. The input processing logic stores the identified non-overhead data in the respective data bit position in the first buffer, if the respective data bit position in the first buffer is marked as empty. The aforementioned respective data bit position in the first buffer corresponds to the bit position in the input word where the identified non-overhead data resides. If the respective data bit position in the first buffer is marked as full, the input processing logic stores the identified non-overhead data in the same respective data bit position in the second buffer. The processing logic is further defined to mark as full the data bit position to which the non-overhead data is stored. The apparatus further includes buffer control logic defined to shift data out of the first buffer when each data bit position in the first buffer is marked as full. Upon shifting data out of the first buffer, the buffer control logic is also defined to transfer data from the second buffer to the first buffer.

Other aspects and advantages of the invention will become more apparent from the following detailed description, taken in conjunction with the accompanying drawings, illustrating by way of example the present invention.

BRIEF DESCRIPTION OF THE DRAWINGS

FIGS. 5A-5V are illustrations showing how the content of the first buffer and the second buffer change during 22 clock cycles of processing the communication protocol frame presented in FIG. 1.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Data is communicated from a transmitting device to a receiving device in the form of a communication protocol frame structure ("frame"). In one embodiment, the frame includes a number of fixed-size blocks of non-overhead data bits separated from each other by variable-size blocks of overhead data bits. The present invention provides for both efficient removal of the overhead data bits from the frame, and recovery of a contiguous stream of the non-overhead data bits from the frame.

Figure 1:
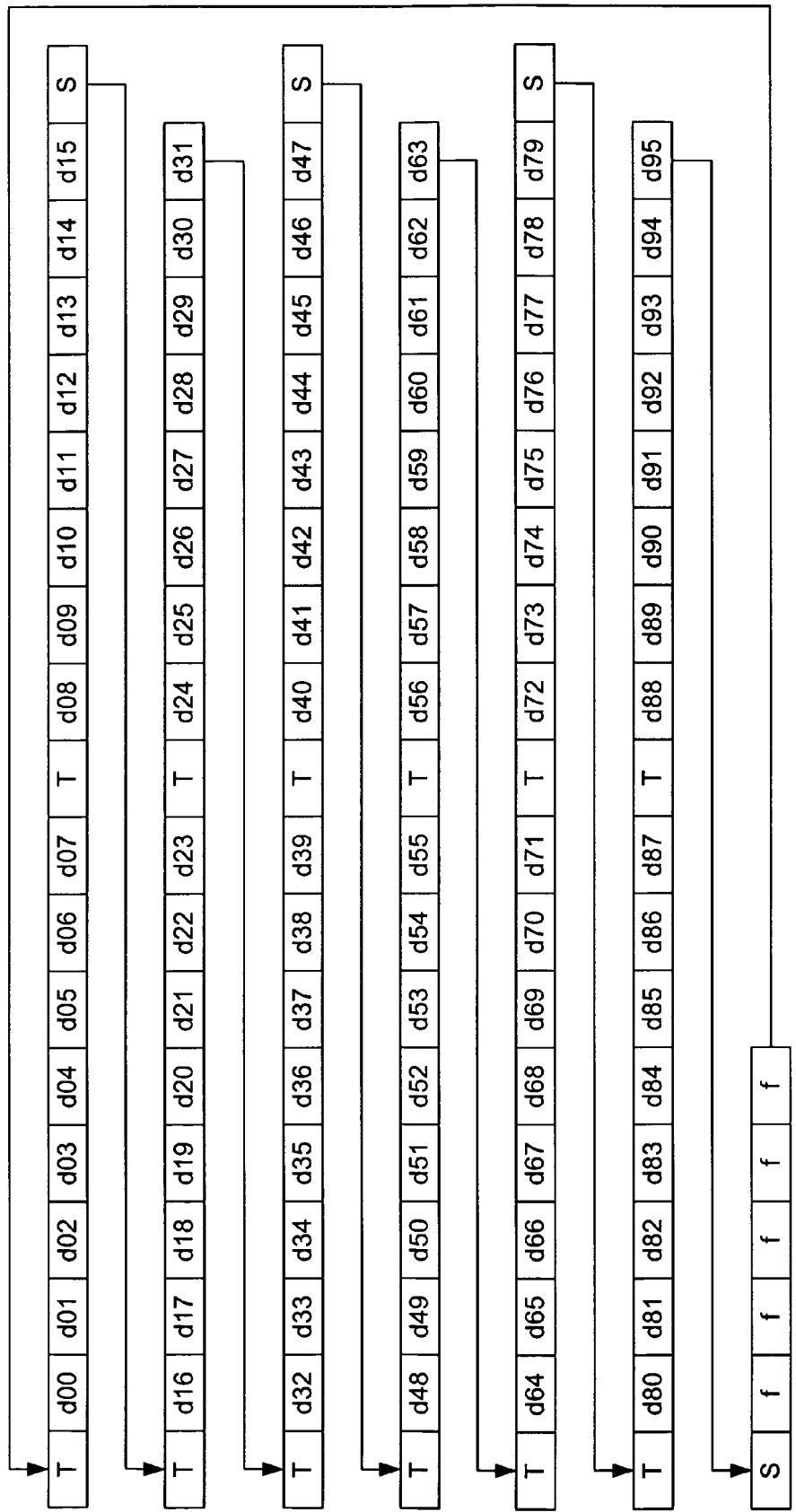
FIG. 1 is an illustration showing an exemplary frame structure having a number of fixed-size blocks of non-overhead data bits separated from each other by variable-size blocks of overhead data bits, in accordance with one embodiment of the present invention.

FIG. 1 is an illustration showing an exemplary frame structure having a number of fixed-size blocks of non-overhead data bits separated from each other by variable-size blocks of overhead data bits, in accordance with one embodiment of the present invention. The frame of FIG. 1 begins with data bit positions T, d00, d01, etc., and ends with data bit positions S, f, f, f, f, f. In the frame of FIG. 1, the non-overhead data bit positions are designated by d##, where ## represents an integer number. The overhead data bit positions are designated as either T, S, or f. Non-overhead data bit positions d00 through d07 represents an 8-bit block of non-overhead data. Similarly, each sequence of non-overhead data bit positions d08-d15, d16-d23, d24-d31, d32-d39, d40-d47, d48-d55, d56-d63, d64-d71, d72-d79, d80-d87, and d88-d95, represents an 8-bit block of non-overhead data. Therefore, the frame of FIG. 1 includes a number of fixed-size (8-bit) blocks of non-overhead data bits. Adjacent fixed-size blocks of non-overhead data bits in the frame are separated from each other by one of the following sequences of overhead data bits: T, S T, or S f f f f f T. Therefore, the fixed-size blocks of non-overhead data bits in the frame are separated by variable-size blocks of overhead data bits.

It should be understood that the frame of FIG. 1 is provided for exemplary purposes to facilitate description of the present invention. The present invention is not limited to use with the particular frame structure of FIG. 1. The present invention can be used in conjunction with any frame structure that includes a number of fixed-size blocks of non-overhead data bits separated from each other by blocks of overhead data bits, wherein the blocks of overhead data bits can be variable-size or fixed-size. For example, the present invention can be used in conjunction with the Optical Internetworking Forum (OIF) Common Electrical I/O-Protocol (CEI-P) frame. The CEI-P frame includes blocks of 64 data bits (i.e., 64 non-overhead bits), wherein successive blocks of 64 data bits are separated by a "T" overhead bit. Also, following every 8 blocks of 64 data bits in the CEI-P frame, an "S" overhead bit is specified in addition to the "T" overhead bit. Additionally, following every 24 blocks of 64 data bits in the CEI-P frame, and "S" overhead bit and 20 "P" overhead bits are inserted. The above-described CEI-P frame is represented as follows:

```
T d . . . d T d . . . d T d . . . d T d . . . d S
T d . . . d T d . . . d T d . . . d T d . . . d
T d . . . d T d . . . d T d . . . d T d . . . d S
T d . . . d T d . . . d T d . . . d T d . . . d
T d . . . d T d . . . d T d . . . d T d . . . d S
T d . . . d T d . . . d T d . . . d T d . . . d
S P . . . P
``` where d . . . d represents 64 data bits, T and S represent overhead bits, and P . . . P represents 20 overhead bits.

In one embodiment, data within the frame (both non-overhead data and overhead data) is transmitted and received in the form of a successive number of input words, wherein each input word is defined to include a fixed number of bit positions. Each received input word may include both non-overhead data and overhead data. The overhead data needs to be extracted from the received input word such that a contiguous stream of non-overhead data can be recovered for use by the receiving device. To create the contiguous stream of non-overhead data, the non-overhead data bits need to be shifted to fill the bit positions occupied by extracted overhead data. Shifting of non-overhead data bits in one input word will cause the non-overhead data bits in the next input word to be shifted by at least the same amount, and so on. Because the number of consecutive overhead data bits can vary, the amount of shifting of non-overhead data bits can vary from location to location in the received frame.

Figure 2:
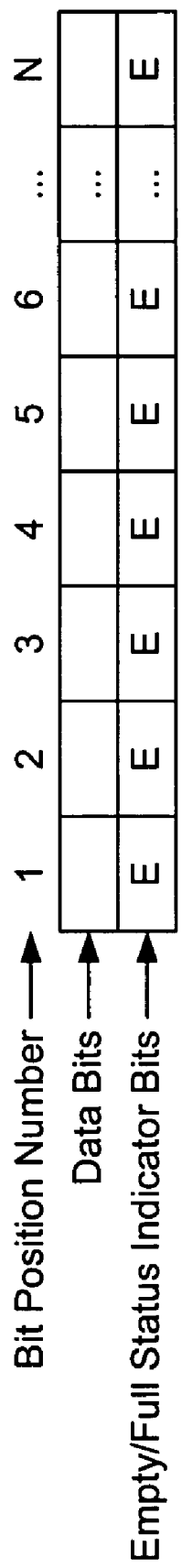
FIG. 2 is an illustration showing a logical representation of the first and the second buffers, in accordance with one embodiment of the present invention.

As discussed in more detail below, the present invention processes each input word of the received frame through two buffers, i.e., a first buffer and a second buffer. FIG. 2 is an illustration showing a logical representation of the first and the second buffers, in accordance with one embodiment of the present invention. The first and second buffers are identified as "Buffer 0" and "Buffer 1," respectively. Each of the first and second buffers (Buffer 0 and Buffer 1) includes a data bit position for each bit position (1 . . . N) in the fixed-size input word to be received, wherein N represents the fixed number of bits in the fixed-size input word. Each of the first and second buffers (Buffer 0 and Buffer 1) also includes a full/empty status indicator bit position uniquely assigned to each data bit position in the respective buffer.

In accordance with each clock cycle, each bit position in the received input word is processed such that each non-overhead data bit in the input word is written to the corresponding bit position in the first buffer (Buffer 0), when the corresponding bit position in the first buffer (Buffer 0) is indicated to have an empty status by the respectively assigned full/empty status indicator bit. If the respectively assigned full/empty status indicator bit indicates that the corresponding bit position in the first buffer (Buffer 0) is full, the non-overhead data bit in the input word is written to the corresponding bit position in the second buffer (Buffer 1). When the non-overhead data bit is written to a given bit position in either the first buffer (Buffer 0) or the second buffer (Buffer 1), the full/empty status indicator bit assigned to the given bit position is set to indicate a full status.

The successively received input words are processed as indicated above. Then, when the first buffer (Buffer 0) fills with non-overhead data, the non-overhead data in the first buffer (Buffer 0) is shifted out, and the non-overhead data in the second buffer (Buffer 1) is shifted to corresponding bit positions in the first buffer (Buffer 0). In conjunction with shifting the non-overhead data from the second buffer (Buffer 1) to the first buffer (Buffer 0), the full/empty status indicator bit settings for the second buffer (Buffer 1) are also transferred to the respective full/empty status indicator bits of the first buffer (Buffer 0). The non-overhead data shifted out of the first buffer (Buffer 0) is rotated as necessary to correspond to the sequence of non-overhead data as received in the input words, i.e., in the frame. Once the non-overhead data from the first buffer (Buffer 0) is rotated to be in proper sequence, the non-overhead data can be processed by the receiving device.

Figure 3:
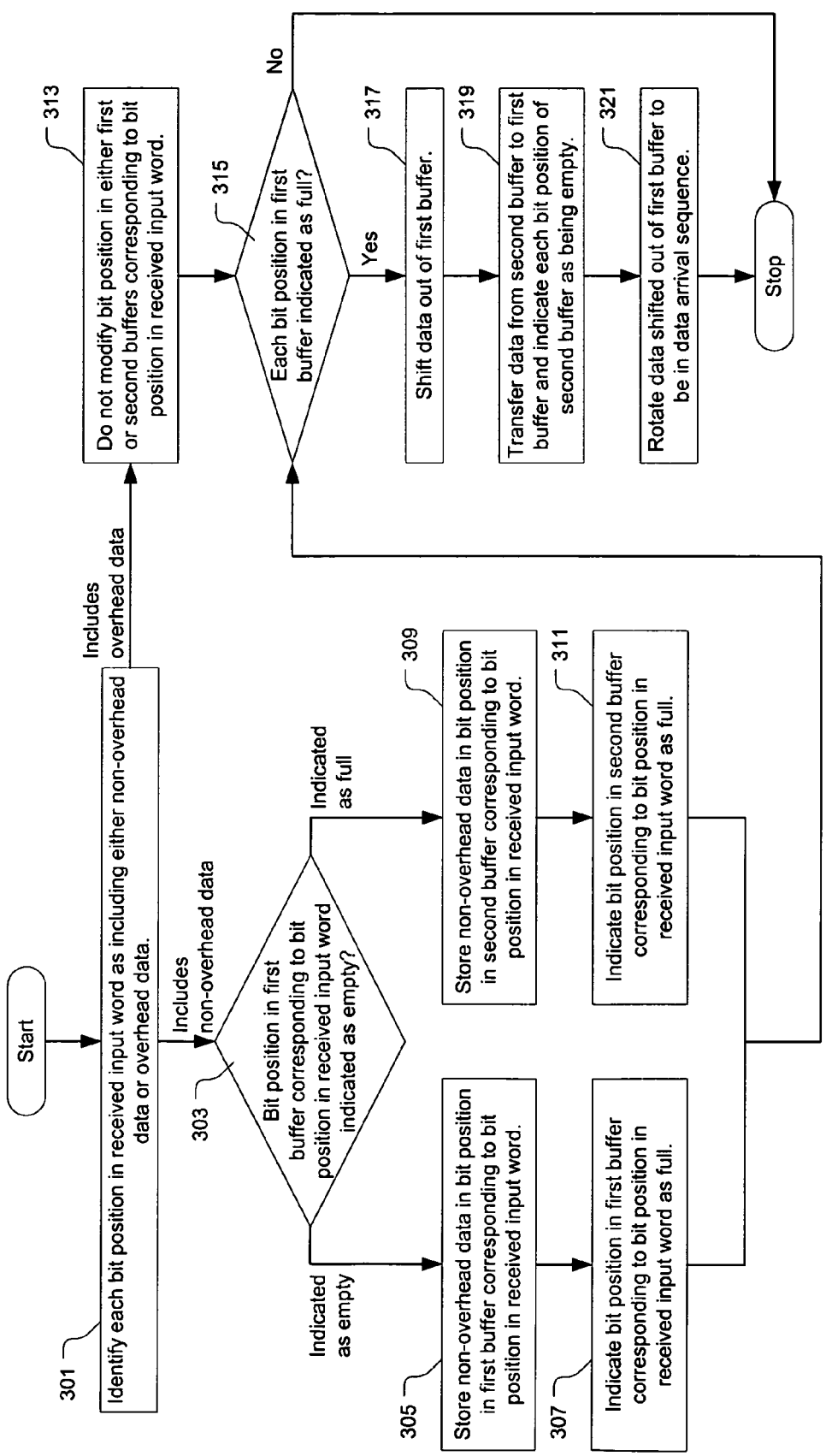
FIG. 3 is an illustration showing a flowchart of a method for processing communication protocol frame input, in accordance with one embodiment of the present invention.

FIG. 3 is an illustration showing a flowchart of a method for processing communication protocol frame input, in accordance with one embodiment of the present invention. The method includes an operation 301 for identifying whether a bit position in a received input word includes non-overhead data. As discussed above, the received input word represents a portion of a communication protocol frame having a fixed frame structure. The fixed frame structure is defined to include fixed-size blocks of non-overhead data bits separated from each other by blocks of overhead data bits, wherein the block of overhead data bits can be either variable-size or fixed-size.

Receipt of an input word represents parallel receipt of each bit position within the input word. The number of bit positions is the same within each received input word. Additionally, the number of bit positions in each received input word evenly divides the number of bits within each fixed-size block of non-overhead data bits. For example, if the above-described CEI-P frame structure is used in conjunction with the method, each fixed-size block of non-overhead data bits will include 64 bits. Therefore, in one embodiment, an input word size of 8 bits could be used in conjunction with the CEI-P frame structure, because the 64 bits of the non-overhead data block is evenly divisible by the 8 bits of the input word size. In view of the foregoing, it should be appreciated that the fixed-size input word may be of different size than each non-overhead data block in the communication protocol frame structure.

Considering that operation 301 identifies a particular bit position in the received input word as including non-overhead data, the method then proceeds with an operation 303. In the operation 303, a determination is made as to whether a data bit position in the first buffer (Buffer 0) corresponding to the particular bit position in the received input word (having been identified as including non-overhead data) is indicated as being empty. If the data bit position in the first buffer (Buffer 0) is determined to be empty, the method proceeds with an operation 305 for storing the non-overhead data from the particular bit position in the received input word in the corresponding bit position in the first buffer (Buffer 0). When the non-overhead data in the particular bit position in the received input word is stored in the corresponding bit position in the first buffer (Buffer 0), an operation 307 is performed to set the empty/full status indicator bit associated with the corresponding bit position in the first buffer (Buffer 0) to indicate a full status, i.e., to indicate that the corresponding bit position in the first buffer (Buffer 0) is full.

If operation 303 determines that the data bit position in the first buffer (Buffer 0) corresponding to the particular bit position in the received input word (having been identified as including non-overhead data) is indicated as being full, the method proceeds with an operation 309 for storing the non-overhead data from the particular bit position in the received input word in the corresponding bit position in the second buffer (Buffer 1). When the non-overhead data in the particular bit position in the received input word is stored in the corresponding bit position in the second buffer (Buffer 1), an operation 311 is performed to set the empty/full status indicator bit associated with the corresponding bit position in the second buffer (Buffer 1) to indicate a full status, i.e., to indicate that the corresponding bit position in the second buffer (Buffer 1) is full.

Referring back to the operation 301, if the bit position in the received input word is not identified as including non-overhead data, i.e., is identified as including overhead data, the method proceeds with an operation 313. According to the operation 313, if a particular bit position in the received input word is identified as including overhead data, the bit position in the first buffer (i.e., both the data bit position and the associated empty/full status bit position) corresponding to the particular bit position in the received input word is not modified. Additionally, according to the operation 313, the bit position in the second buffer (i.e., both the data bit position and the associated empty/full status bit position) that corresponds to the particular bit position in the received input word is not modified. In various embodiments, the identified overhead data can be discarded or redirected to an overhead processing block. To avoid unnecessarily obscuring the present invention, the overhead processing block is not described herein. However, one skilled in the art should have an appreciation for the functionality of an overhead processing block in handling overhead data bits extracted from a communication protocol frame.

As previously described with respect to FIG. 2, each of the first buffer (Buffer 0) and the second buffer (Buffer 1) includes a number of data bits that is equal to the fixed number of bits in each input word to be received. Also, it should be understood that prior to receiving a first input word of a communication protocol frame to be processed in accordance with the present method, each empty/full status indicator bit in both the first buffer (Buffer 0) and the second buffer (Buffer 1) is set, i.e., initialized, to indicate that its corresponding data bit position (in the first buffer (Buffer 0) and the second buffer (Buffer 1)) is empty. Additionally, it should be understood that each of operations 301 through 313 is performed for each bit position in the received input word in a parallel manner. Thus, each bit position in a given received input word is simultaneously processed in accordance with operations 301 through 313.

Following either of operations 307, 311, or 313, the method proceeds with an operation 315. In the operation 315, a determination is made as to whether each data bit position in the first buffer (Buffer 0) is indicated as being full. If the operation 315 determines that each data bit position in the first buffer (Buffer 0) is not full, processing of the currently received input word is complete. However, if the operation 315 determines that each data bit position in the first buffer (Buffer 0) is full, the method proceeds to an operation 317 for shifting data out of the first buffer (Buffer 0). When shifting data out of the first buffer (Buffer 0), the non-overhead data stored in each bit position of the first buffer (Buffer 0) is shifted out in a simultaneous and parallel manner.

The method also includes an operation 319 for transferring data from the second buffer (Buffer 1) to the first buffer (Buffer 0) when the non-overhead data is shifted out of the first buffer (Buffer 0). Shifting of the data from the second buffer (Buffer 1) to the first buffer (Buffer 0) includes shifting the value stored in each data bit position in the second buffer (Buffer 1) to the corresponding data bit position in the first buffer (Buffer 0). Shifting of the data from the second buffer (Buffer 1) to the first buffer (Buffer 0) also includes shifting the status indicator value stored in each empty/full status indicator bit position in the second buffer (Buffer 1) to the corresponding empty/full status indicator bit position in the first buffer (Buffer 0). Once the data in the second buffer (Buffer 1) is shifted to the first buffer (Buffer 0), each empty/ full status indicator bit position in the second buffer (Buffer 1) is set to indicate an empty status.

The non-overhead data shifted out of the first buffer (Buffer 0) will have a cyclic shift due to the overhead bits in the received input words. Before the data shifted out of the first buffer (Buffer 0) can be used by the receiving device, the data needs to be rotated, i.e., cyclically shifted, to align with the received input word boundaries. In other words, the non-overhead data shifted out of the first buffer (Buffer 0) needs to be rotated to be in the same sequence as it was received in the input words, i.e., to be in the data arrival sequence. The method includes an operation 321 for rotating the data shifted out of the first buffer (Buffer 0) to be in the data arrival sequence.

In one embodiment, operation 321 is performed by shifting out the non-overhead data stored in each bit position of the first buffer (Buffer 0) to rotation logic. The rotation logic is defined to rotate the non-overhead data shifted out of the first buffer (Buffer 0) to be in the data arrival sequence. The data rotation performed by the rotation logic can be done in multiple stages using a logarithmic sequence of rotates. For example, the data can be passed through a number of rotation stages which are respectively defined to rotate the data by 1 bit position, 2 bit positions, 4 bit positions, 8 bit positions, as required.

The data rotation, i.e., cyclic shifting, is a simple and regular process because no data bits need to be removed. Therefore, all data bits have the same rotation amount. The rotation amount for a given set of non-overhead data having been shifted out of the first buffer (Buffer 0) can be determined based on the number of overhead bits that have arrived in the communication protocol frame prior to the clock cycle in which the set of non-overhead data is shifted out of the first buffer (Buffer 0). An overhead bit count is maintained to represent the number of overhead bits that have arrived in the communication protocol frame prior to the clock cycle in which the set of non-overhead data is shifted out of the first buffer (Buffer 0). The number of bit positions by which the non-overhead data shifted out of the first buffer (Buffer 0) needs to be rotated is equal to the overhead bit count modulo N, where N is the number of bit positions in the input word.

It should be understood that N is also the number of data bit positions in each of the first and second buffers (Buffers 0 and 1) and the number of non-overhead data bits shifted out of the first buffer (Buffer 0). It should be appreciated that because the data is rotated upon being shifted out of the first buffer (Buffer 0), the data rotation does not need to be performed in a single clock cycle, thus enabling use of multiple rotation stages. However, it should also be appreciated that the method of FIG. 3 is implemented such that operations 301-319 are performed in a single clock cycle. The operations in the method of FIG. 3 may be performed by appropriately defined circuitry, i.e., hardware, wherein the circuitry is defined to operate autonomously or in accordance with direction provided by program instructions stored on a computer readable medium.

Figure 4:
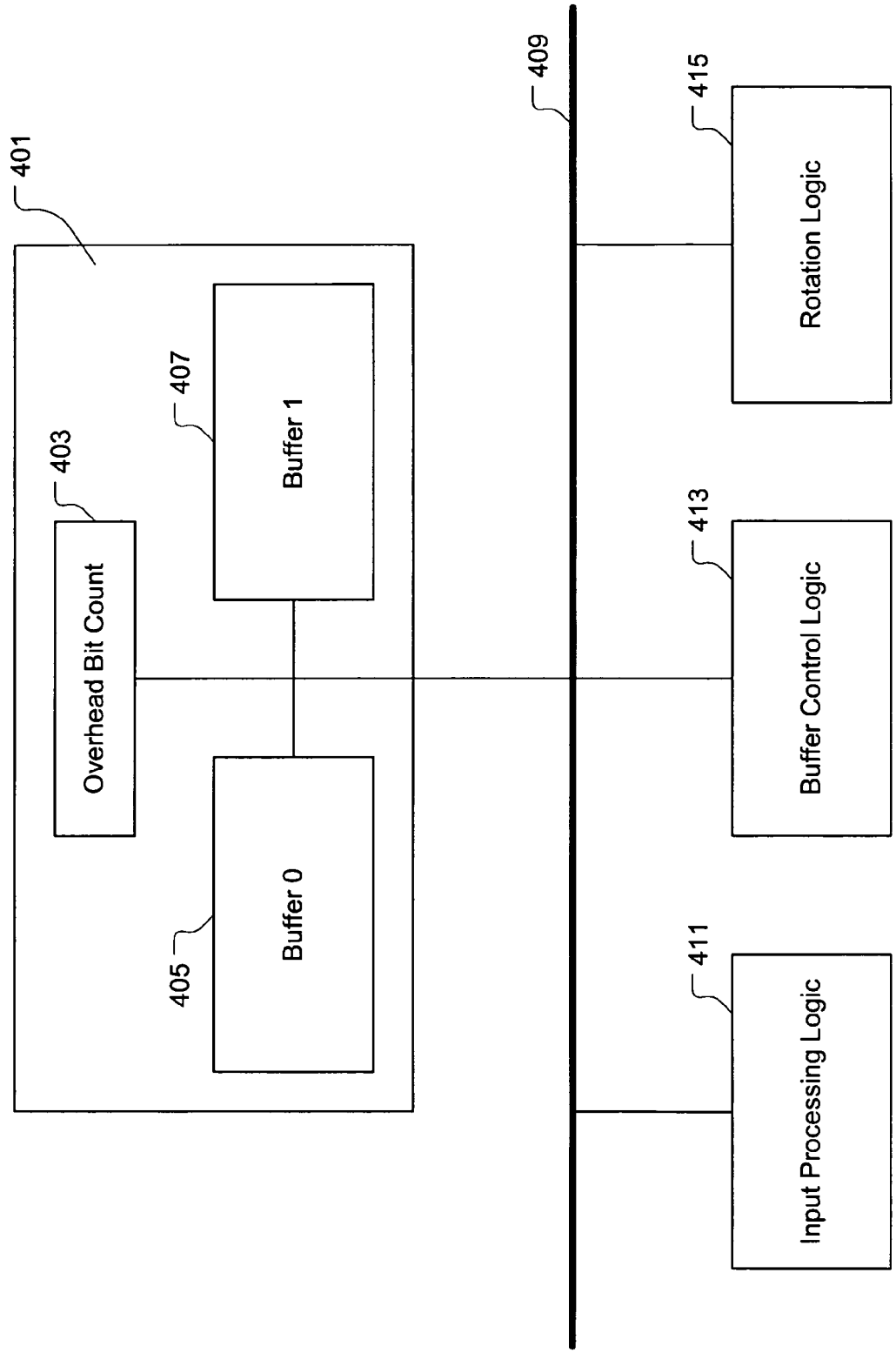
FIG. 4 is an illustration showing an apparatus for processing communication protocol frame input, in accordance with one embodiment of the present invention.

FIG. 4 is an illustration showing an apparatus for processing communication protocol frame input, in accordance with one embodiment of the present invention. The apparatus of FIG. 4 is defined to implement the method of FIG. 3, as described above. The apparatus includes a memory 401, input processing logic 411, buffer control logic 413, and rotation logic 415. The memory 401 includes the first buffer (Buffer 0) 405, the second buffer (Buffer 1) 407, and an overhead bit count memory location 403. Each of the input processing logic 411, buffer control logic 413, and rotation logic 415 is defined to communicate with the memory 401 through a bus 409. Each of the first buffer (Buffer 0) 405 and the second buffer (Buffer 1) 407 is defined as previously described with respect to FIG. 2. Thus, each of the first buffer (Buffer 0) 405 and the second buffer (Buffer 1) 407 is defined to include a respective data bit position and corresponding empty/full status indicator bit for each bit position in an input word to be processed.

The input processing logic 411 is defined to implement operations 301 through 313 of the method of FIG. 3. The input processing logic 411 is defined to identify non-overhead data in each bit position in the input word. The input processing logic 411 is also defined to store each identified non-overhead data bit from the input word in the respective data bit position in the first buffer (Buffer 0) 405, when the respective data bit position in the first buffer (Buffer 0) 405 is marked as empty. The input processing logic 411 is further defined to store each identified non-overhead data bit from the input word in the respective data bit position in the second buffer (Buffer 1) 407, when the respective data bit position in the first buffer (Buffer 0) 405 is marked as full. When the identified non-overhead data bit from the input word is stored in a given bit position in either the first buffer (Buffer 0) 405 or the second buffer (Buffer 1) 407, the input processing logic 411 is defined to mark the given bit position as full.

As previously described with respect to FIG. 2, each of the first buffer (Buffer 0) 405 and the second buffer (Buffer 1) 407 includes a number of status bit positions uniquely associated with each data bit position. The input processing logic 411 is defined to reference each status bit position to determine if its associated data bit position is empty or full. The input processing logic 411 is further defined to modify each status bit position to mark its associated data bit position as empty or full, as appropriate. Additionally, prior to processing a first input word of a communication protocol frame, the input processing logic 411 is defined to set, i.e., initialize, each status bit in the first buffer (Buffer 0) 405 and second buffer (Buffer 1) 407 to mark its associated data bit position as empty.

The input processing logic 411 is also defined to identify overhead data in a given bit position in the input word, and leave the corresponding data bit positions in the first buffer (Buffer 0) 405 and the second buffer (Buffer 1) 407 unmodified. In one embodiment, identification of the overhead bits by the input processing logic 411 can be implemented using a lookup table stored in the memory 401, wherein the lookup table specifies the position of the overhead bits in each input word to be received in each clock cycle. It should be appreciated that the input processing logic 411 does not have to worry about shifting the non-overhead data in the received input words after removal of the overhead data. Therefore, the input processing logic 411 can be simplified and can operate faster with fewer gates, as compared to circuitry defined to shift the non-overhead data bits upon receipt.

The buffer control logic 413 is defined to implement operations 315 through 319 of the method of FIG. 3. The buffer control logic 413 is defined to shift data out of the first buffer (Buffer 0) 405 when each data bit position in the first buffer (Buffer 0) 405 is marked as full. The buffer control logic 413 is further defined to transfer data from the second buffer (Buffer 1) 407 to the first buffer (Buffer 0) 405 upon shifting data out of the first buffer (Buffer 0) 405. The input processing logic 411 and buffer control logic 413 are defined to perform their respective functions in a single, common clock cycle.

The rotation logic 415 is defined to receive the data shifted out of the first buffer (Buffer 0) 405 by the buffer control logic 413. The rotation logic 415 is defined to rotate the data shifted out of the first buffer (Buffer 0) 405 to be in the data arrival sequence, wherein the data arrival sequence corresponds to the sequence of the non-overhead data as it was received in the input words. The rotation logic 415 is defined to access the overhead bit count 403 within the memory 401. The overhead bit count 403 represents a count of overhead data bits that have been received in the communication protocol frame prior to the currently received input word, i.e., prior to the current clock cycle. The overhead bit count 403 is maintained by the input processing logic 411. The rotation logic 415 is defined to rotate the data shifted out of the first buffer (Buffer 0) 405 by a number of bit positions equal to the overhead bit count 403 modulo the number of bit positions in the received input word.

It should be appreciated that the apparatus of FIG. 4 represents one exemplary apparatus for implementing the method of FIG. 3. It should be appreciated that in other embodiments the method operations of FIG. 3 can be implemented with alternative logic modules and configurations than what is specifically described with respect to the apparatus of FIG. 4.

FIGS. 5A-5V are illustrations showing how the content of the first buffer (Buffer 0) and the second buffer (Buffer 1) change during 22 clock cycles of processing the communication protocol frame previously presented in FIG. 1. The communication protocol frame processing illustrated in FIGS. 5A-5V is based on an 8-bit input word size. Each of FIGS. 5A-5V shows the input word content as received in the indicated cycle, the content of the first buffer (Buffer 0) following completion of the indicated cycle, the content of the second buffer (Buffer 1) following completion of the indicated cycle, the content of the output word shifted out of the first buffer (Buffer 0) following completion of the indicated cycle, the overhead bit count up to but not including the indicated cycle, the output rotation amount to be applied to the output word shifted out of the first buffer (Buffer 0), and the final rotated output word following rotation by the number of bit positions indicated by the output rotation amount.

FIG. 5A represents an initialized state prior to receipt of the first input word of the frame of FIG. 1. It should be noted that "E" and "F" represent empty and full, respectively, in the various empty/full status indicator bit positions of the first and second buffers (Buffer 0 and Buffer 1). FIG. 5B represents clock cycle 1 in which the first input word of the frame is received. The "T" overhead bit in the first bit position of the input word is ignored. The data bits "d00" through "d06" in the second through eighth bit positions of the input word are stored in respective bit positions in the first buffer (Buffer 0) that were indicated as being empty prior to clock cycle 1.

FIG. 5C represents clock cycle 2 in which the second input word of the frame is received. The "T" overhead bit in the second bit position of the input word is ignored. The data bit "d07" in the first bit position of the input word is stored in the respective bit position in the first buffer (Buffer 0) that was indicated as being empty prior to clock cycle 2. The data bits "d08" through "d13" in the input word are stored in their respective bit positions in the second buffer (Buffer 1) because each of their respective bit positions in the first buffer (Buffer 0) is indicated as being full. Because each of the bit positions in the first buffer (Buffer 0) is indicated as being full, the content of the first buffer (Buffer 0) is shifted out as indicated by "output word." Also, when the data is shifted out of the first buffer (Buffer 0), data bits "d08" through "d13" in the second buffer (Buffer 1) are shifted to their respective bit positions in the first buffer (Buffer 0). Prior to cycle 2, the overhead bit count was 1. Therefore, 1 modulo 8 is equal to 1. Thus, the rotation amount to be applied to the output word is 1 bit position. The resulting rotated output word is shown to have been rotated by one bit position to place the non-overhead data bits in the data arrival sequence.

FIG. 5D represents clock cycle 3 in which the third input word of the frame is received. Each of the "S" and "T" overhead bits in the input word is ignored. Each of the data bits "d14" and "d15" in the input word is stored in their respective bit position in the first buffer (Buffer 0), which was indicated as being empty prior to clock cycle 3. The data bits "d16" through "d19" in the input word are stored in their respective bit positions in the second buffer (Buffer 1) because each of their respective bit positions in the first buffer (Buffer 0) was indicated as being full prior to clock cycle 3. Because each of the bit positions in the first buffer (Buffer 0) is indicated as being full, the content of the first buffer (Buffer 0) is shifted out as indicated by "output word." Also, when the data is shifted out of the first buffer (Buffer 0), data bits "d16" through "d19" in the second buffer (Buffer 1) are shifted to their respective bit positions in the first buffer (Buffer 0). Prior to cycle 3, the overhead bit count was 2. Therefore, 2 modulo 8 is equal to 2. Thus, the rotation amount to be applied to the output word is 2 bit positions. The resulting rotated output word is shown to have been rotated by two bit positions to place the non-overhead data bits in the data arrival sequence.

FIGS. 5E-5V show how the input words received in clock cycles 4 through 21, respectively, are processed according to the method of FIG. 3. It should be noted that data is not shifted out of the first buffer (Buffer 0) in each of clock cycles 1, 8, 15, 18, because at least one bit position in the first buffer (Buffer 0) is indicated as being empty in each of these particular clock cycles. Processing of the communication protocol frame of FIG. 1 continues beyond cycle 21 in accordance with the method of FIG. 3.

In accordance with the foregoing, it should be appreciated that an efficient apparatus and method is provided for removing overhead bits and recovering non-overhead data bits from protocol frames, such as CEI-P, without requiring large and complex shifting logic. Additionally, the apparatus and method described above enables shifting of the non-overhead data received in an input word to be deferred to a later time, i.e., later clock cycle, when the shifting can be done using simplified circuitry and without control bits. It should be appreciated that the simplified logic for eliminating overhead bits, as described herein, represents a more efficient and simpler shifting circuit than that of the prior art barrel shifter/shift register approach. It should be further appreciated that the simplified logic for eliminating overhead bits, as described herein, enables simpler routing of wide data paths.

The apparatus and method for processing communication protocol frame input as described herein may be incorporated into a programmable logic device. The programmable logic device may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any other suitable application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A method for processing communication protocol frame input, comprising:
    (a) identifying whether a bit position in a received input word includes non-overhead data;
    (b) if a data bit position in a first buffer corresponding to the bit position in the received input word is indicated as being empty, storing the non-overhead data in the data bit position in the first buffer and indicating the data bit position in the first buffer as being full, otherwise storing the non-overhead data in a data bit position in a second buffer and indicating the data bit position in the second buffer as being full, wherein the data bit position in the second buffer corresponds to the bit position in the received input word, wherein operations (a) and (b) are performed for each bit position in the received input word in a parallel manner;
    (c) shifting data out of the first buffer when each data bit position in the first buffer is indicated as being full; and
    (d) transferring data from the second buffer to the first buffer when data is shifted out of the first buffer.

2. A method for processing communication protocol frame input as recited in claim 1, wherein the received input word represents a portion of a communication protocol frame having a fixed frame structure.

3. A method for processing communication protocol frame input as recited in claim 1, wherein a number of data bits in each of the first buffer and the second buffer is equal to a fixed number of bits in each input word to be received.

4. A method for processing communication protocol frame input as recited in claim 1, wherein operations (a) through (d) are performed in a single clock cycle.

5. A method for processing communication protocol frame input as recited in claim 1, further comprising:
    identifying the bit position in the received input word as including overhead data;
    leaving the data bit position in the first buffer corresponding to the bit position in the received input word unmodified; and
    leaving the data bit position in the second buffer corresponding to the bit position in the received input word unmodified.

6. A method for processing communication protocol frame input as recited in claim 1, wherein indicating the data bit position in the first buffer as being full is performed by setting a status bit uniquely associated with the data bit position in the first buffer, and wherein indicating the data bit position in the second buffer as being full is performed by setting a status bit uniquely associated with the data bit position in the second buffer.

7. A method for processing communication protocol frame input as recited in claim 6, further comprising:
    setting each status bit uniquely associated with data bits in the first and second buffers to indicate that its associated data bit is empty prior to receiving a first input word of a communication protocol frame.

8. A method for processing communication protocol frame input as recited in claim 1, wherein operation (c) is performed to shift data out of the first buffer to rotation logic.

9. A method for processing communication protocol frame input as recited in claim 8, further comprising:
    rotating data shifted out of the first buffer to place the data shifted out of the first buffer in a data arrival sequence, wherein the data arrival sequence corresponds to a sequence of the non-overhead data in the received input word.

10. A method for processing communication protocol frame input as recited in claim 9, further comprising:
    maintaining a count of overhead data bits received in a communication protocol frame prior to the received input word; and
    rotating data shifted out of the first buffer by a number of bit positions equal to the count of overhead data bits modulo a number of bit positions in the received input word.

11. A method for processing communication protocol frame input as recited in claim 1, wherein performance of the method operations is directed by program instructions stored on a computer readable medium.

12. An apparatus for processing communication protocol frame input, comprising:
    a first buffer including a respective data bit position for each bit position in an input word;
    a second buffer including a respective data bit position for each bit position in the input word;
    input processing circuitry defined to identify non-overhead data in each bit position in the input word, store the non-overhead data in the respective data bit position in the first buffer if the respective data bit position in the first buffer is marked as empty, store the non-overhead data in the respective data bit position in the second buffer if the respective data bit position in the first buffer is marked as full, and mark as full the data bit position to which the non-overhead data is stored; and
    buffer control circuitry defined to shift data out of the first buffer when each data bit position in the first buffer is marked as full, and transfer data from the second buffer to the first buffer upon shifting data out of the first buffer.

13. An apparatus for processing communication protocol frame input as recited in claim 12, wherein the input word represents a portion of a communication protocol frame having a fixed frame structure.

14. An apparatus for processing communication protocol frame input as recited in claim 12, wherein the input processing circuitry and the buffer control circuitry are defined to perform their functions in a single, common clock cycle.

15. An apparatus for processing communication protocol frame input as recited in claim 12, wherein the first buffer includes a number of status bit positions uniquely associated with each data bit position in the first buffer, the second buffer including a number of status bit positions uniquely associated with each data bit position in the second buffer, the input processing circuitry defined to reference each status bit position to determine if its associated data bit position is empty or full, the input processing circuitry further defined to modify each status bit position to mark its associated data bit position as empty or full as appropriate.

16. An apparatus for processing communication protocol frame input as recited in claim 5, wherein the input processing circuitry is defined to set each status bit in the first and second buffers to mark its associated data bit position as empty prior to processing a first input word of a communication protocol frame.

17. An apparatus for processing communication protocol frame input as recited in claim 12, wherein the input processing circuitry is further defined to identify overhead data in each bit position in the input word, and leave the respective data bit position in the first and second buffer unmodified.

18. An apparatus for processing communication protocol frame input as recited in claim 12, further comprising:

rotation circuitry defined to receive data shifted out of the first buffer by the buffer control circuitry, the rotation circuitry defined to rotate the data shifted out of the first buffer to place the data shifted out of the first buffer in a data arrival sequence, wherein the data arrival sequence corresponds to a sequence of the non-overhead data in the input word.

19. An apparatus for processing communication protocol frame input as recited in claim 18, wherein the input processing circuitry is defined to maintain a count of overhead data bits received in a communication protocol frame prior to the received input word.

20. An apparatus for processing communication protocol frame input as recited in claim 19, wherein the count of overhead data bits is accessible by the rotation circuitry, the rotation circuitry defined to rotate data shifted out of the first buffer by a number of bit positions equal to the count of overhead data bits modulo a number of bit positions in the received input word.

* * * * *